(12) United States Patent
Oki et al.

(10) Patent No.: US 10,232,478 B2
(45) Date of Patent: Mar. 19, 2019

(54) TOOL MAGAZINE DEVICE AND MACHINE TOOL

(71) Applicant: KOMATSU NTC LTD., Nanto (JP)

(72) Inventors: Nobuhito Oki, Nanto (JP); Minoru Sawada, Nanto (JP); Muneyoshi Horii, Nanto (JP)

(73) Assignee: KOMATSU NTC LTD., Nanto (JP)

( * ) Notice: Subject to any disclaimer, the term of this patent is extended or adjusted under 35 U.S.C. 154(b) by 428 days.

(21) Appl. No.: 14/913,446

(22) PCT Filed: Jul. 31, 2014

(86) PCT No.: PCT/JP2014/070187
§ 371 (c)(1),
(2) Date: Feb. 22, 2016

(87) PCT Pub. No.: WO2015/037357
PCT Pub. Date: Mar. 19, 2015

(65) Prior Publication Data
US 2016/0199957 A1 Jul. 14, 2016

(30) Foreign Application Priority Data

Sep. 13, 2013 (JP) ................................ 2013-190706

(51) Int. Cl.
*B23Q 3/157* (2006.01)
*B23Q 3/155* (2006.01)

(52) U.S. Cl.
CPC ..... *B23Q 3/15706* (2013.01); *B23Q 3/15526* (2013.01); *B23Q 3/15722* (2016.11);
(Continued)

(58) Field of Classification Search
CPC ......... Y10T 483/1818; Y10T 483/1827; Y10T 483/1873; Y10T 483/1882;
(Continued)

(56) References Cited

U.S. PATENT DOCUMENTS 2,318,081 A * 5/1943 Kerry ....................... B25H 3/04
211/131.1
3,277,568 A * 10/1966 Wetzel ............... B23Q 3/15713
483/53
(Continued)

FOREIGN PATENT DOCUMENTS

CN 202963999 U 6/2013
CN 203156426 U 8/2013
(Continued)

OTHER PUBLICATIONS

Komatsu NTC Ltd., Tool Magazine Device and Machine Tool, The First Office Action, dated Jul. 31, 2014; 9 pages, The State Intellectual Property Office of People's Republic of China.
(Continued)

*Primary Examiner* — Erica E Cadugan
*Assistant Examiner* — Yasir Diab
(74) *Attorney, Agent, or Firm* — Cantor Colburn LLP

(57) ABSTRACT

A tool magazine device includes a rail that is annularly formed and that has a separation section at a part in a circumferential direction of the rail and a holding ring that is arranged coaxially with the rail and that is rotated by a driving motor. The holding ring is provided with a plurality of holding sections that are open in an axial direction of the holding ring. The holding sections are arranged in the circumferential direction of the holding ring. A tool pot is held to be insertable into and extractable from each holding section. A conveyance unit sends out the tool pot placed in the holding section to an exchange position and sends the tool pot into the holding section from the exchange position. A roller supported by each tool pot rolls on the rail in response to the rotation of the holding ring.

4 Claims, 5 Drawing Sheets

(52) U.S. Cl.
CPC .............. *B23Q 2003/1553* (2016.11); *B23Q 2003/15532* (2016.11); *Y10T 483/1798* (2015.01); *Y10T 483/1827* (2015.01); *Y10T 483/1864* (2015.01); *Y10T 483/1873* (2015.01); *Y10T 483/1882* (2015.01)

(58) Field of Classification Search
CPC ............ B23Q 3/15722; B23Q 3/15526; B23Q 2003/1553; B23Q 2003/15528
See application file for complete search history.

(56) References Cited

U.S. PATENT DOCUMENTS

| | | | | |
|---|---|---|---|---|
| 3,296,903 | A | * | 1/1967 | Coate ................. B23Q 3/15526 483/27 |
| 3,355,797 | A | * | 12/1967 | Lohneis ................. B23Q 3/157 483/63 |
| 5,300,006 | A | * | 4/1994 | Tanaka ............... B23Q 3/15706 483/56 |
| 5,672,145 | A | * | 9/1997 | Pollington ......... B23Q 3/15526 211/1.52 |
| 5,871,426 | A | | 2/1999 | Araki et al. |
| 7,223,221 | B2 | * | 5/2007 | Sugata ................... B23Q 1/626 409/134 |
| 2003/0125175 | A1 | | 7/2003 | Seo |
| 2005/0239620 | A1 | * | 10/2005 | Lutz ................... B23Q 3/15526 483/63 |
| 2008/0207417 | A1 | | 8/2008 | Braun |
| 2009/0053004 | A1 | * | 2/2009 | Yamaura ................ B23Q 1/623 409/165 |
| 2010/0145498 | A1 | * | 6/2010 | Uchikawa .......... B23Q 3/15733 700/179 |

FOREIGN PATENT DOCUMENTS

| | | |
|---|---|---|
| CN | 103223611 A | 7/2016 |
| JP | 6239147 A | 2/1987 |
| JP | H1058264 A | 3/1998 |
| JP | 10109243 A | 4/1998 |
| JP | 2000094252 A | 4/2000 |
| JP | 2002355729 A | 12/2002 |

OTHER PUBLICATIONS

International Preliminary Search Report on Patentability; International Application No. PCT/JP2014/070187; International Filing Date Jul. 31, 2014; dated Mar. 15, 2016, 5 pages.
International Search Report in related PCT/JP2014/070187 dated Oct. 28, 2014.

* cited by examiner

TOOL MAGAZINE DEVICE AND MACHINE TOOL

FIELD OF THE INVENTION

This invention relates to a tool magazine device that stores a plurality of tools, and relates to a machine tool that includes the tool magazine device.

BACKGROUND OF THE INVENTION

Patent Document 1 discloses such a tool magazine device. This conventional tool magazine device includes a magazine body, a plurality of tool pots supported by the magazine body, and an index disk that allows the tool pots to rotate for indexing. An annular rail is formed on an undersurface of the magazine body. Guide grooves are formed on an inner surface, on an outer surface, and on the undersurface of the rail, respectively. Each tool pot has a plurality of rollers each of which is engaged with each guide groove. Each tool pot is suspended onto the rail through the roller, and is supported to be movable in a circumferential direction. The index disk is supported to be rotatable in a lower part of the magazine body.

In this conventional tool magazine device, each of the tools is suspended onto the lower part of the magazine body in a state of being attached to the tool pot. Therefore, the tools are radially arranged along an outer peripheral surface of the magazine body. This configuration makes it possible to increase the number of tools that are storable in the tool magazine device while limiting the height of the tool magazine device to a low level.

However, according to this configuration, as described above, guide grooves are required to be formed on the inner surface, on the outer surface, and on the undersurface of the rail, respectively. Rollers, each of which is engaged with one of the guide grooves, are required to be arranged in the tool pots, respectively. Additionally, the magazine body is required to be configured to support a tool pot and a tool attached to the tool pot while suspending these components onto the rail. Therefore, a problem has resided in the fact that the configuration of the tool magazine device becomes complex.

PRIOR ART DOCUMENTS

Patent Documents

Patent Document 1: Japanese Laid-Open Patent Publication No. H10-109243

SUMMARY OF THE INVENTION

An object of the present invention is to provide a tool magazine device that is capable of being simplified in device configuration and that is capable of increasing the number of storable tools, and is to provide a machine tool that includes the tool magazine device.

To solve the problem, according to a first aspect of the present invention, a tool magazine device is provided that includes a rail that is annularly formed and that has a separation section at a part in a circumferential direction of the rail, a holding ring that is arranged coaxially with the rail and that has a plurality of holding sections opened in an axial direction of the rail, the plurality of holding sections being arranged along the circumferential direction, a driving motor to rotate the holding ring around an axis of the holding ring, a tool pot that is held to be insertable into and extractable from the holding section and to which a tool is detachably attached, and a conveyance unit that sends the tool pot placed in the holding section to an exchange position and that sends the tool pot into the holding section from the exchange position, in which a roller supported by the tool pot rolls on the rail in response to rotation of the holding ring, and, when the tool pot moves by the conveyance unit, the roller supported by the tool pot passes through the separation section of the rail.

According to this configuration, it is possible to radially arrange the plurality of tools along the outer peripheral surface of the holding ring while limiting the height of the tool magazine device to a low level. Additionally, it is possible to stably support each of the plurality of tools on the rail through one roller.

Therefore, unlike a conventional configuration in which tools are supported by being suspended onto a rail, a plurality of guide grooves are not required to be formed in the rail, and a plurality of rollers are not required to be arranged at the tool. Therefore, it is possible to simplify the configuration of the tool magazine device.

DETAILED DESCRIPTION OF THE PREFERRED EMBODIMENTS

A preferred embodiment in which a tool magazine device and a machine tool including the device are embodied will be hereinafter described with reference to FIG. 1 to FIG. 5.

Figure 1:
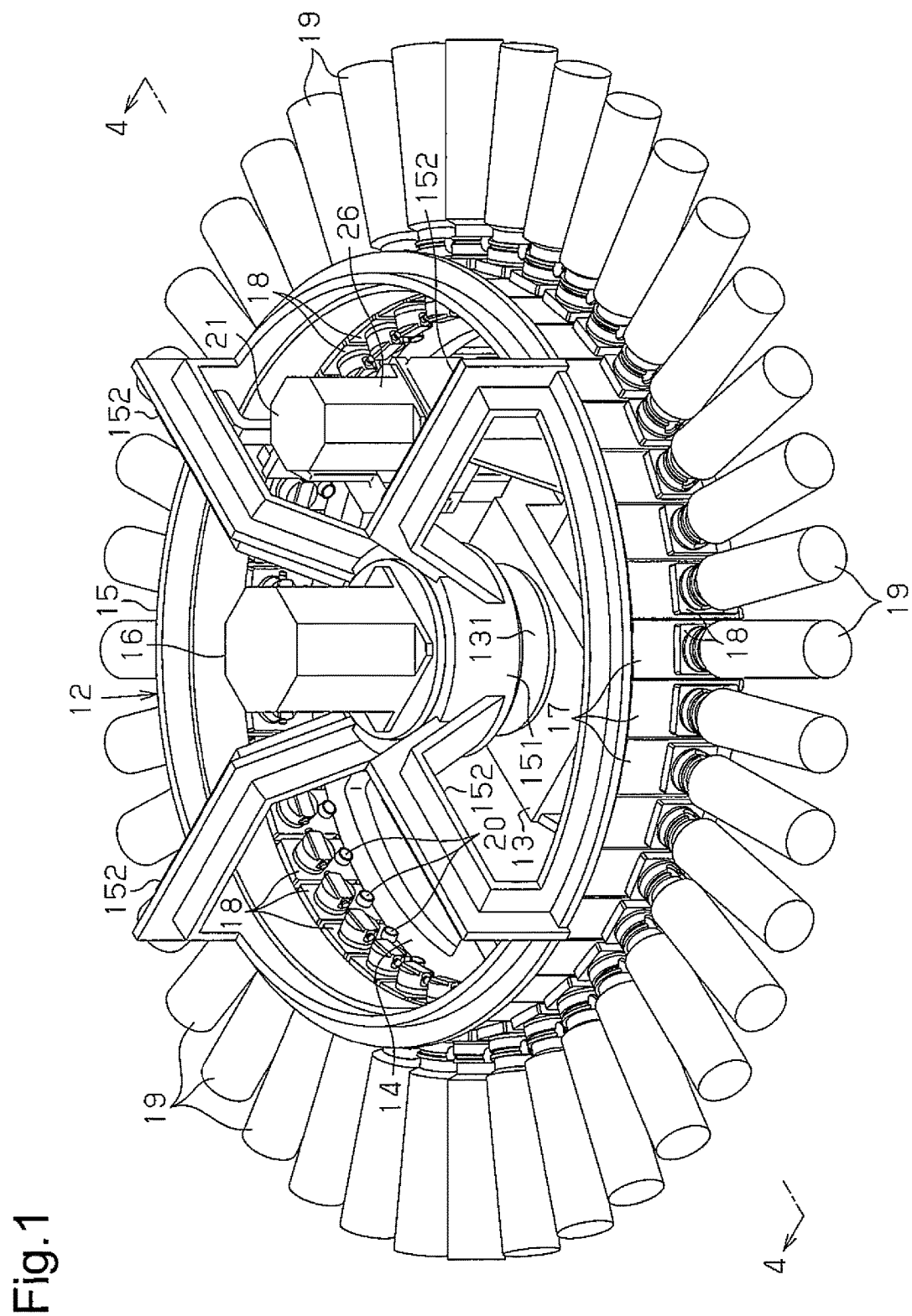
FIG. 1 is a perspective view showing a tool magazine device according to one preferred embodiment of the present invention.
Figure 2:
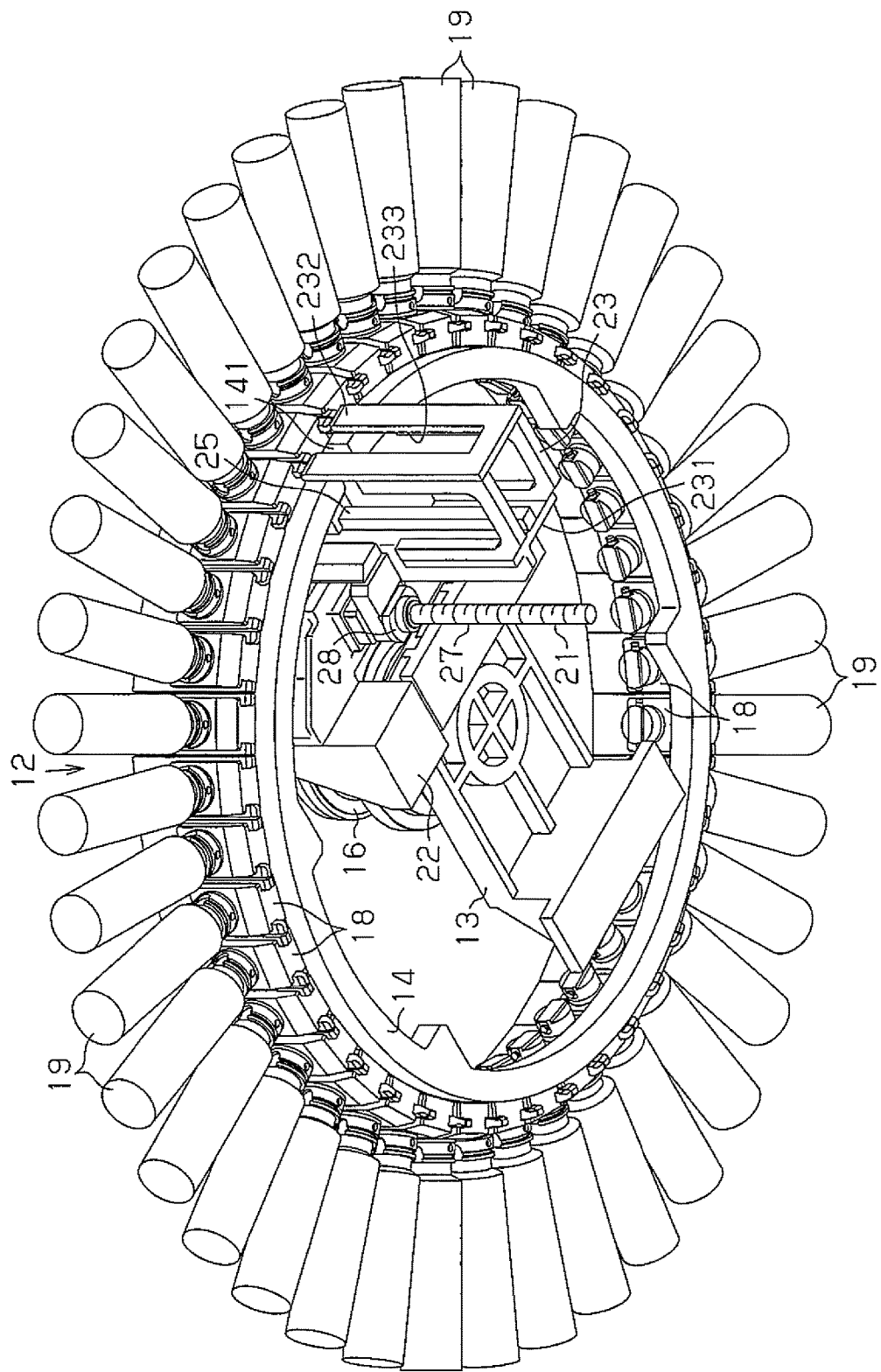
FIG. 2 is perspective view of the tool magazine device seen from below.
Figure 4:
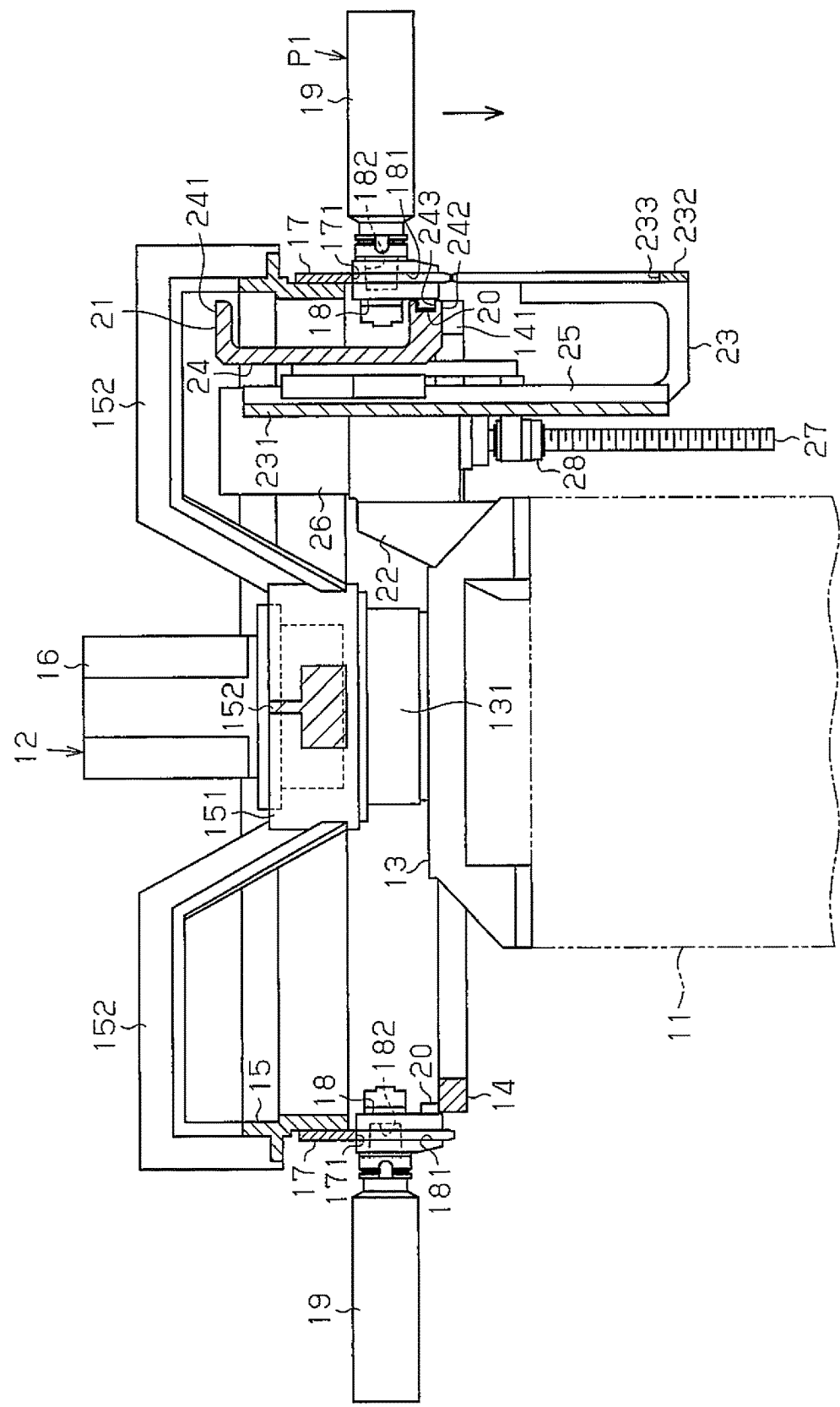
FIG. 4 is a cross-sectional view taken along line 4-4 of FIG. 1.

As shown in FIG. 1, FIG. 2, and FIG. 4, the machine tool includes a machine frame 11 and a tool magazine device 12 arranged at an upper end of the machine frame 11. The tool magazine device 12 includes a support stand 13 fixed onto the machine frame 11. An annular rail 14 is fixed onto the support stand 13 through a stay (not shown). An upper surface of the rail 14 is arranged horizontally. A separation section 141 that has a predetermined opening width is formed at a part in the circumferential direction of the rail 14.

As shown in FIG. 1 and FIG. 4, a support shaft 131 is arranged at the center position of the rail 14, and is formed on an upper surface of the support stand 13. A support ring 151 is rotationally fitted to an outer peripheral surface of the support shaft 131. The support ring 151 includes a holding ring 15 that has substantially the same diameter as the rail 14. The holding ring 15 is arranged coaxially with the rail 14 by means of a plurality of support arms 152. A driving motor 16 to rotate the holding ring 15 is arranged on the support shaft 131. A plurality of holding plates 17 are fixed to an outer peripheral surface of the holding ring 15. The holding plates 17 are arranged along the circumferential direction of the holding ring 15.

Figure 3:
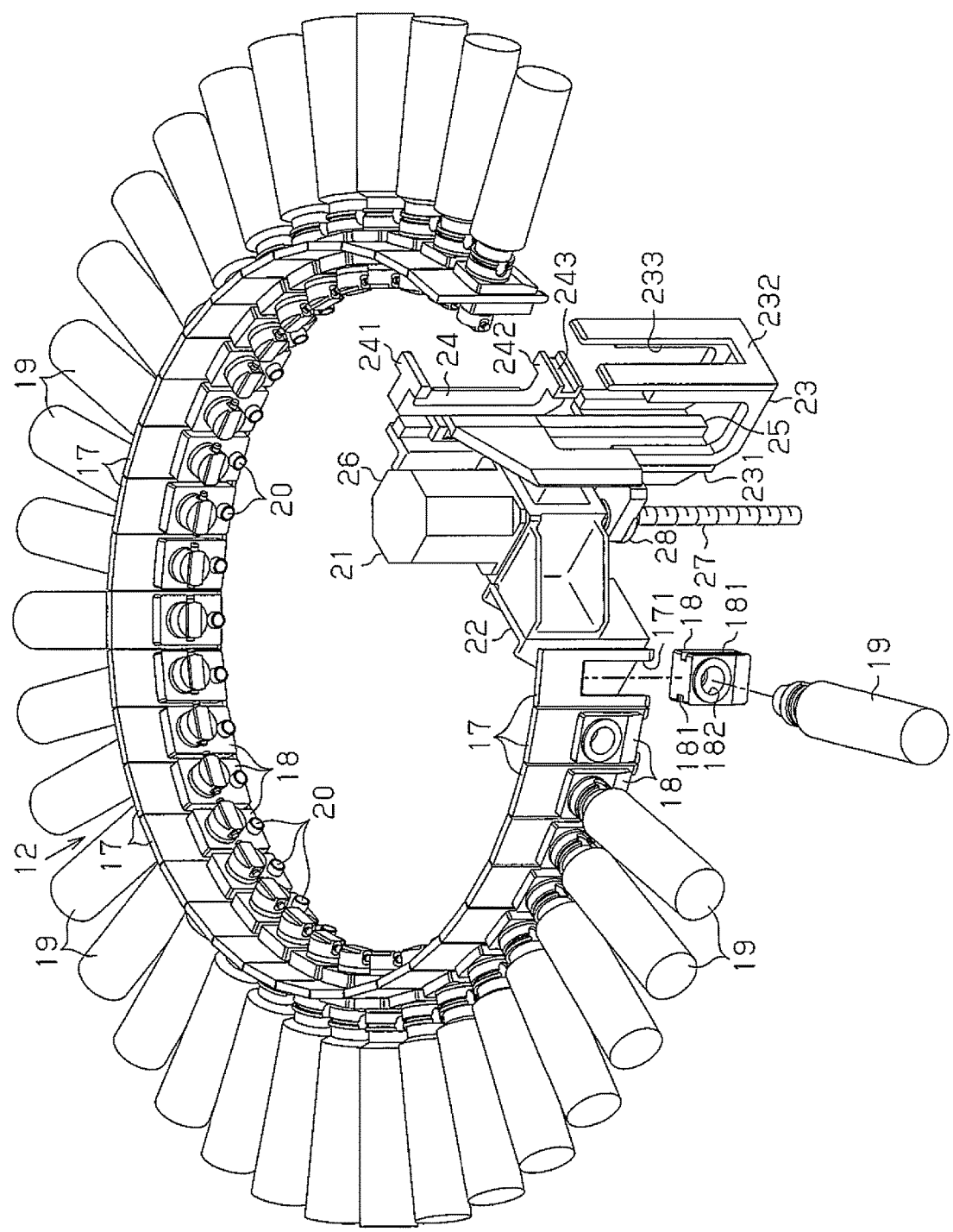
FIG. 3 is a partial exploded perspective view of the tool magazine device.

As shown in FIG. 3, a concave holding section 171 is formed in each holding plate 17. The holding section 171 is open downwardly in the axial direction of the holding ring 15. A tool pot 18 is held in each holding section 171. The tool pot 18 is extractable downwardly from the inside of the holding section 171. One engagement groove 181 is formed in each of both sides of the tool pot 18. The engagement groove 181 is engagable with an inner edge of the holding section 171.

A mounting hole 182 is formed in an outer surface of the tool pot 18. A tool 19 is insertable into and extractable from the mounting hole 182. One roller 20 is rotationally supported at the lower end of a rear side surface of the tool pot 18. The roller 20 rotates while coming into contact with the upper surface of the rail 14. As a result, the tool pot 18 is movable along the upper surface of the rail 14 while being held in the holding section 171 by means of the rail 14.

As shown in FIG. 1 to FIG. 3, a plurality of tools 19 that differ from each other in type or in size are mounted in the mounting holes 182 of the tool pots 18, respectively. Each of these tool pots 18 is held in a corresponding holding section 171 of the holding plate 17. As a result, the tools 19 are radially arranged along the outer peripheral surface of the holding ring 15. In this state, the roller 20 of each tool pot 18 rolls on the upper surface of the rail 14 when the driving motor 16 is driven to rotate the holding ring 15. As a result, as shown in FIG. 4, the tool pot 18 holding a predetermined tool 19 is arranged at a waiting position P1 corresponding to the separation section 141 of the rail 14.

As shown in FIG. 2 to FIG. 5, a conveyance unit 21 is arranged on the support stand 13. The conveyance unit 21 is placed at a position corresponding to the separation section 141 of the rail 14. The conveyance unit 21 moves the tool pot 18 in which the tool 19 has been mounted between the waiting position P1 and an exchange position P2 arranged below the waiting position P1. The waiting position P1 is arranged at the upper end of the inside of the holding section 171 on the holding ring 15.

A configuration of the conveyance unit 21 will be hereinafter described with reference to FIG. 1 to FIG. 4.

As shown in FIG. 3 and FIG. 4, a guide member 23 is fixed onto the support stand 13 with a bracket 22 therebetween. The guide member 23 is arranged at a position corresponding to the separation section 141 of the rail 14. The guide member 23 has an inner wall section 231 and an outer wall section 232. The guide member 23 is formed substantially in the shape of the letter U when viewed laterally. A concave guide section 233 is formed in the outer wall section 232. The guide section 233 can communicate with the holding section 171 holding the tool pot 18 arranged at the waiting position P1.

As shown in FIG. 2 to FIG. 4, an up-and-down member 24 is supported by the inner wall section 231 to be movable upwardly and downwardly through the rail 25. A projection 241 is formed at the upper end of the up-and-down member 24, whereas a projection 242 is formed at the lower end of the up-and-down member 24. Both projections 241 and 242 are movable in the up-down direction in the separation section 141 of the rail 14. An engagement groove 243 is formed at the forward end of the projection 242. The roller 20 on the tool pot 18 that moves on the rail 14 passes through the engagement groove 243. Additionally, the roller 20 of the tool pot 18 arranged at the waiting position P1 is contained in the engagement groove 243.

As shown in FIG. 1, FIG. 3, and FIG. 4, an up-and-down movement motor 26 is arranged on the bracket 22, and is arranged near the inside of the guide member 23. When the up-and-down movement motor 26 is driven, the rotational motion of the up-and-down movement motor 26 is converted into linear motion by means of a ball screw 27 and a nut member 28, and is transmitted to the up-and-down member 24. As a result, when the up-and-down member 24 moves upwardly or downwardly, the tool pot 18 is sent out of the holding section 171 arranged at the waiting position P1 to the exchange position P2 along with the tool 19 or is sent into the holding section 171 from the exchange position P2 because the roller 20 and the engagement groove 243 are engaged with each other.

Figure 5:
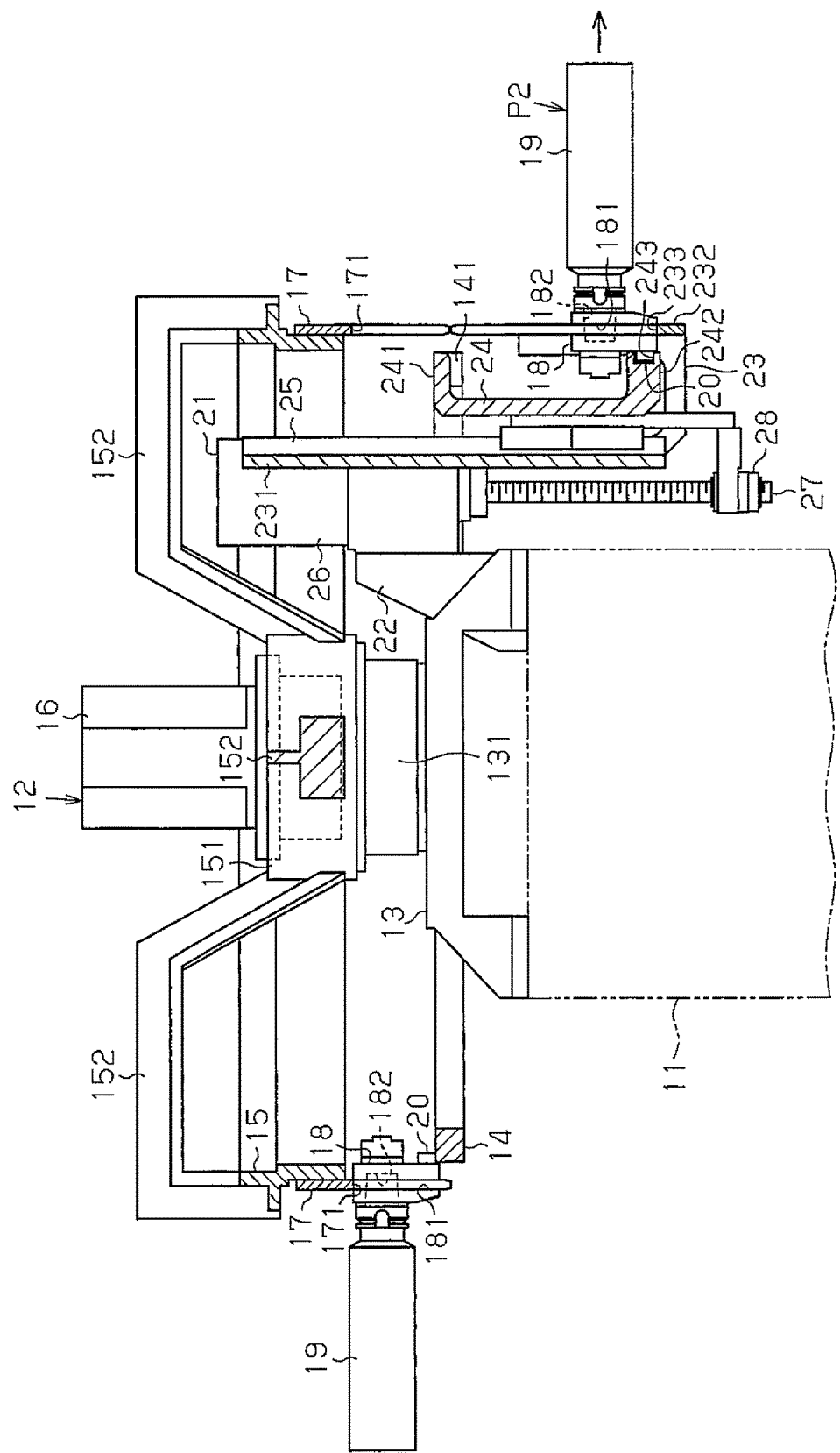
FIG. 5 is a cross-sectional view showing an operation of the tool magazine device.

Next, an operation of the tool magazine device 12 will be described with reference to FIG. 4 and FIG. 5.

In machine tools, there is a case in which a tool attached to a main shaft (not shown) is exchanged for another tool. In this case, when the driving motor 16 is driven to rotate the holding ring 15, the rollers 20 of the tool pots 18 held in the holding ring 15 roll on the upper surface of the rail 14, and pass through the engagement groove 243 of the up-and-down member 24 successively. Thereafter, as shown in FIG. 4, the tool pot 18 in which a predetermined tool 19 has been mounted is arranged at the waiting position P1 corresponding to the separation section 141 of the rail 14. Therefore, the roller 20 of the tool pot 18 arranged at the waiting position P1 is arranged at the separation section 141 of the rail 14, and is contained in the engagement groove 243 of the up-and-down member 24.

When the up-and-down movement motor 26 of the conveyance unit 21 is driven in this state, the rotational motion of the up-and-down movement motor 26 is converted into linear motion by means of the ball screw 27 and the nut member 28, and is transmitted to the up-and-down member 24. As a result, when the up-and-down member 24 descends, the tool pot 18 is pulled out from the holding section 171 arranged at the waiting position P1 along with the tool 19, and moves downwardly along the guide section 233 of the guide member 23, and is sent to the exchange position P2 shown in FIG. 5 because the roller 20 and the engagement groove 243 are engaged with each other. Thereafter, a tool exchanger (not shown) extracts the tool 19 from the mounting hole 182 of the tool pot 18 at the exchange position P2, and attaches this to the main shaft. Furthermore, the tool exchanger mounts the used tool 19 extracted from the main shaft in the mounting hole 182 of the tool pot 18 arranged at the exchange position P2.

Thereafter, when the up-and-down movement motor 26 rotates in a direction opposite to its direction taken when the up-and-down member 24 descends, the up-and-down member 24 ascends. When the up-and-down member 24 ascends, the tool pot 18 moves upwardly from the exchange position P2 along with the used tool 19 along the guide section 233 of the guide member 23, and is sent into the holding section 171 arranged at the waiting position P1 because the roller 20 and the engagement groove 243 are engaged with each other.

Therefore, it is possible to acquire the following effects according to the present preferred embodiment.

(1) The tool magazine device 12 includes the annular rail 14, the holding ring 15 arranged coaxially with the rail 14, and the driving motor 16 to rotate the holding ring 15 around its axis. The separation section 141 is formed at a part in the circumferential direction of the rail 14. The plurality of holding plates 17 are fixed onto the outer peripheral surface of the holding ring 15. The plurality of holding plates 17 are arranged along the circumferential direction of the holding ring 15. Each holding plate 17 has the holding section 171 that is open downwardly in the axial direction of the holding ring 15. The tool pot 18 is held in each holding section 171.

The tool pot 18 is capable of being pulled out downwardly from the inside of the holding section 171. The conveyance unit 21 sends the tool pot 18 placed in the holding section 171 to the exchange position P2, and sends the tool pot 18 into the holding section 171 from the exchange position P2. The roller 20 is rotationally supported by each tool pot 18. The roller 20 rolls on the rail 14 in response to the rotation of the holding ring 15.

According to this configuration, it is possible to radially arrange the plurality of tools 19 along the outer peripheral surface of the holding ring 15 while limiting the height of the tool magazine device 12 to a low level without widening its breadth. Additionally, it is possible to stably support each of the plurality of tools 19 on the rail 14 through one roller 20. Therefore, unlike a conventional configuration in which tools are supported by being suspended onto a rail, a plurality of guide grooves are not required to be formed in the rail 14, and a plurality of rollers 20 are not required to be arranged at the tool. Therefore, it is possible to simplify the configuration of the tool magazine device 12. Still additionally, it is possible to increase the number of tools 19 that are storable in the tool magazine device 12. Therefore, it is possible to compactly arrange the tool magazine device 12 in, for example, the upper end of the machine tool.

(2) The rail 14 is arranged horizontally. Therefore, it is possible to evenly support the plurality of tools 19 held by the holding ring 15 in the upper surface of the rail 14 that is a horizontal plane. Therefore, it is possible to smoothly index the tool 19.

(3) The tool pot 18 is supported by the rail 14 through the roller 20. Therefore, it is possible to lower the rigidity of the holding ring 15 or of the holding plate 17 that holds the tool pot 18. Therefore, it is possible to reduce the tool magazine device in weight. In addition, the tool pot 18 is restrained from moving in directions other than in the up-down direction by being held by the holding plate 17. Thus, it is only necessary for the roller 20 to chiefly receive the weight of the tool pot 18. Therefore, it is possible to simplify the configuration of the tool magazine device 12 with a smaller number of rollers 20.

(4) The tool 19 is indexed merely by rotating the holding ring 15. Therefore, a period of time required to index the tool 19 becomes short, and it is possible to efficiently exchange the tool 19.

The present preferred embodiment may be modified as follows.

A holding section 171 to hold the tool pot 18 may be formed directly at the holding ring 15 instead of excluding the holding plate 17.

Each tool pot 18 may have a plurality of rollers 20.

The invention claimed is:

1. A tool magazine device comprising:
   a rail that is annularly formed and that has a separation section at a part in a circumferential direction of the rail;
   a holding ring that is arranged coaxially with the rail and that has a plurality of holding sections opened in an axial direction of the rail, the plurality of holding sections being arranged along the circumferential direction;
   a driving motor to rotate the holding ring around an axis of the holding ring;
   a tool pot that is held to be insertable into and extractable from the holding section and to which a tool is detachably attached; and
   a conveyance unit that sends the tool pot placed in the holding section to an exchange position and that sends the tool pot into the holding section from the exchange position;
   wherein a roller supported by the tool pot rolls on the rail in response to rotation of the holding ring, and, when the tool pot moves in an up-down direction by the conveyance unit, the roller supported by the tool pot passes in the up-down direction through the separation section of the rail.

2. The tool magazine device according to claim 1, wherein the rail is horizontally arranged.

3. The tool magazine device according to claim 1 wherein the holding ring is provided with a plurality of holding plates arranged along the circumferential direction of the holding ring, and the holding section is formed at each of the plurality of holding plates.

4. A machine tool that includes the tool magazine device according to claim 1, the machine tool comprising a machine frame on which the tool magazine device is arranged, the tool magazine device being arranged at an upper end of the machine frame.

* * * * *